United States Patent
Yamada et al.

[11] Patent Number: 5,434,001
[45] Date of Patent: Jul. 18, 1995

[54] FLUORORESIN-COATED ARTICLE

[75] Inventors: Katsuya Yamada; Masahiro Morita; Nobutaka Matsushita; Yoshichika Nishimura; Fumio Matsuyama, all of Osaka, Japan

[73] Assignee: Sumitomo Electric Industries, Ltd., Osaka, Japan

[21] Appl. No.: 103,999

[22] Filed: Aug. 10, 1993

Related U.S. Application Data

[63] Continuation of Ser. No. 718,511, Jun. 21, 1991, abandoned.

Foreign Application Priority Data

Jun. 23, 1990 [JP] Japan .................... 2-165290
Jun. 30, 1990 [JP] Japan .................... 2-173130
Apr. 19, 1991 [JP] Japan .................... 3-189611

[51] Int. Cl.$^6$ ......................... B32B 15/08
[52] U.S. Cl. ......................... 428/335; 428/336; 428/421; 428/422; 428/463
[58] Field of Search ............ 428/324, 328, 336, 421, 428/422, 463, 335

[56] References Cited

U.S. PATENT DOCUMENTS

| | | | |
|---|---|---|---|
| 4,122,226 | 10/1978 | Vassiliou | 428/187 |
| 4,123,401 | 10/1978 | Berghmans et al. | 523/210 |
| 4,165,404 | 8/1979 | Quehl | 428/422 X |
| 4,252,859 | 2/1981 | Concannon et al. | 428/422 |
| 4,351,882 | 9/1982 | Concannon | 428/422 |
| 4,886,699 | 12/1989 | Carroll et al. | 428/422 X |
| 4,888,245 | 12/1989 | Witzko | 428/421 |
| 4,950,538 | 8/1990 | Honda et al. | 428/421 X |
| 5,106,682 | 4/1992 | Matsushita et al. | 428/324 |
| 5,168,013 | 12/1992 | Tannenbaum | 428/422 |
| 5,194,335 | 3/1993 | Effenberger et al. | 428/421 |

*Primary Examiner*—D. S. Nakarani
*Attorney, Agent, or Firm*—Sughrue, Mion, Zinn, Macpeak & Seas

[57] ABSTRACT

A fluororesin-coated article having excellent corrosion resistance is disclosed, which comprises a base plate having a finely roughened surface and having thereon a layer of a fluororesin composition containing a fluororesin comprising a mixture of a heat-fusible fluororesin and PTFE, the content of the heat-fusible fluororesin in the mixture being 2% by weight or more but less than 12% by weight based on the total amount of the fluororesin. The fluororesin composition layer may contain an inorganic pigment in an amount of 1 to 25% by weight based on the total amount of solid components of the composition. A fluororesin-coated article free of pinholes in its coatings is also disclosed, which comprises a base plate having thereon a fluororesin coating and further thereon a surface layer containing substantially no pigment and adhesion aid and comprising a mixture of a heat-fusible fluororesin and polytetrafluoroethylene, the content of the heat-fusible fluororesin being 2% by weight or more but less than 12% by weight based on the total amount of the mixture.

23 Claims, 2 Drawing Sheets

FLUORORESIN-COATED ARTICLE

This is a Continuation of application Ser. No. 07/718,511, filed on Jun. 21, 1991, now abandoned.

FIELD OF THE INVENTION

The present invention relates to a fluororesin-coated article. More particularly, the invention relates to a fluororesin-coated article which employs at least PTFE (polytetrafluoroethylene) and a heat-fusible fluororesin, such as PFA (a tetrafluoroethylene-perfluoroalkyl vinyl ether copolymer), FEP (a tetrafluoroethylene-hexafluoropropylene copolymer) or the like, and has excellent corrosion resistance.

BACKGROUND OF THE INVENTION

Prior-art techniques concerning the fluororesin-coated articles according to the first and second aspects of the present invention which will be described later, are first explained.

In conventional methods for adhering PTFE or the like to metals, the metal surface is roughened by blasting such as sandblasting, grid blasting, or the like, subsequently a fluororesin primer containing an adhesive such as PAI (poly(amideimide)), PES (polyethersulfone) or the like is applied on the surface, and then a fluororesin is coated thereon. However, such methods have the following problems:

(1) The fluororesin-coated metal plate cannot be subjected to so-called post-processing in which the coated plate is shaped by pressing into a pot, frying pan, etc., because the primer coating has too low an elongation at break.

(2) White coatings or colored coatings such as those of bright colors cannot be formed since the PAI, PES or the like turns brown upon baking. Even if the coating may be colored gold, light brown or the like to utilize the brown color of the PAI, PES or the like, the color fastness of the coating is so poor that these colors fade upon exposure to sunlight, etc. Therefore, the coating color is practically limited to dark colors such as black and dark colors of metallic tones.

In another method for adhering fluororesins to metals, the metal surface is extremely finely roughened by chemical or electrochemical etching and a fluororesin coating is formed thereon, thereby bonding the coating to the metal by means of an anchoring effect. According to this method, the coating film can retain its elongation at break and have sufficient adhesion, so that the coated metal plate can be press-shaped in post-processing.

Even in the above method, however, if a pigment is incorporated into a fluororesin composition in order to obtain a colored fluororesin coating, adhesion to the metal surface is severely impaired and practically required bonding strengths cannot be obtained.

In addition, even in the case of incorporating no pigment, coatings utilizing an anchoring effect are caused to show significantly impaired adhesion to the metal surface and be apt to develop pinholes when the fluororesin composition is applied to metal plates which, after being coated, are subjected to post-processing under severe pressing conditions such that the thickness of aluminum base plate is reduced by more than 10% of the original thickness. Because of this, it has been difficult to obtain coated articles having good corrosion resistance.

In still another method which is a further improvement of the above technique, an adhesive such as PAI, PES, or the like is incorporated into a fluororesin composition along with a pigment in such amounts as to not severely impair the elongation at break of the coating, subsequently the composition is coated on the finely roughened surface of a base plate, and then a fluororesin layer containing substantially no pigment and adhesive is formed as all outermost layer, whereby a coated article capable of being subjected to press shaping and exhibiting a minimized deterioration in surface non-tackiness due to the incorporation of adhesive can be obtained.

However, the above improved method is still insufficient in producing highly corrosion-resistant coated articles under severe pressing conditions because the incorporation of PAI, PES, or the like tends to decrease the elongation at break of the coating and increase the number of pinholes formed in the coating.

Further, since the PAI and PES turn brown upon baking, the problem that white coatings turn beige and coatings of bright colors come to be of dim colors remains unsolved. Furthermore, since these colors fade upon exposure to sunlight, etc., only coatings of dark colors, metallic-tone dark colors and the like are obtained. Although it has also been attempted to obtain white or bright colors by utilizing a color fading phenomenon due to sunlight, etc., i.e., by decoloring the brown color of PAI or PES after baking by means of an ultraviolet lamp, this technique is disadvantageous in cost.

Prior-art techniques concerning the fluororesin-coated article according to the third aspect of the present invention which will be described later, are now explained.

In order to obtain a highly corrosion-resistant fluororesin-coated article such as a PTFE-coated article, it is necessary that the coating should be exceedingly good in either (1) being free from coating defects such as pinholes or (2) having enhanced adhesion to the base plate, or should (3) have well-balanced properties with respect to the above (1) and (2).

It is normally extremely difficult to obtain coating films of PTFE which are completely free from pinholes and other defects. Therefore, coated articles exceedingly good in property (1) above have been obtained by a method in which a plurality of layers are formed by repeated coating operations to eliminate through-holes extending to the base plate. This method has been effective in considerably reducing the number of pinholes. However, the above method has a problem that as a result of an increased number of coating operations, the resin layers formed by earlier coating are exposed repeatedly to temperatures not lower than the sintering temperature to thereby deteriorate gradually. In addition, the above method has been disadvantageous in cost because of an increased resin amount and an increased number of steps.

On the other hand, coated articles excellent in property (2) above have been obtained by a method in which a fluororesin primer containing an adhesive such as PAI, PES or the like is applied on a base plate and a fluororesin layer is formed thereon. There is, however, a problem that such a primer layer is extremely prone to develop coating defects such as pinholes. Moreover, the coated articles produced by the above method have another problem in that their applications are limited since they cannot be subjected to so-called post-processing in which they are shaped by pressing into a pot, frying pan, etc., because of the low elongation at break of the coatings.

As an expedient for improving the above methods to attain (3), i.e., well-balanced properties of (1) and (2), a method has been attempted in which the surface of a metal plate is extremely finely roughened by chemical or electrochemical etching, a layer of a fluororesin with which a small amount of a primer has been mixed is formed on the roughened surface, thereby establishing adhesion based on a balance between an anchoring effect and adhesion by the primer, and then a fluororesin containing substantially no pigment and adhesive is coated thereon. Although coated articles produced by this method are considerably improved in practically required properties as compared with coated articles produced by the two methods described above, they are still insufficient for use in post-processing conducted under more severe conditions or for use as a pan for boiling, a grill pan for making sukiyaki, hotchpotch, etc., or the like which are used under more severe conditions than rice cooker-warmers.

SUMMARY OF THE INVENTION

Accordingly, an object of the present invention is to provide a fluororesin-coated article which has an improved adhesion between a coating and a base plate regardless of addition of a pigment in the coating, and which does not suffer deterioration in properties, such as discoloration due to the browning or other color changes of ordinarily employed adhesives including PAI, PES, etc., a decrease in elongation at break of the coating, and a diminution in non-tackiness, shows a high bonding strength between the coating and the base plate, contains few pinholes in the coating, and has excellent corrosion resistance.

Another object of the present invention is to provide a fluororesin-coated article free from reduction in adhesion between the coating and the base plate due to incorporation of a pigment, and which does not suffer the above-described property deterioration.

Still another object of the present invention is to provide a fluororesin-coated article to which higher corrosion resistance is imparted due to diminished pinholes.

Other objects and effects of the present invention will be apparent from the following description.

According to the first aspect of the present invention, a fluororesin-coated article is provided which comprises a base plate having a finely roughened surface and having formed on the surface a layer of a fluororesin composition containing a fluororesin comprising a mixture of a heat-fusible fluororesin and PTFE (polytetrafluoroethylene), the content of the heat-fusible fluororesin being 2% by weight or more but less than 12% by weight based on the total amount of the fluororesin.

Preferred embodiments of the fluororesin-coated article according to the first aspect of the present invention include:

(A) A fluororesin-coated article in which the heat-fusible fluororesin is PFA (a tetrafluoroethylene-perfluoroalkyl vinyl ether copolymer);

(B) A fluororesin-coated article in which the heat-fusible fluororesin is FEP (a tetrafluoroethylene-hexafluoropropylene copolymer);

(C) A fluororesin-coated article in which the base plate is an aluminum or aluminum-alloy plate having a surface which has been finely roughened by chemical or electrochemical etching; and (D) A fluororesin-coated article in which the fluororesin contains substantially no adhesive other than the heat-fusible fluororesin.

According to the second aspect of the present invention, a fluororesin-coated article is provided which comprises a base plate having a finely roughened surface and having formed on the surface a layer of a fluororesin composition containing substantially no heat-resistant polymer and containing (i) an inorganic pigment in an amount of 1 to 25% by weight based on the total amount of solid components of the composition and (ii) a fluororesin comprising a mixture of a heat-fusible fluororesin and PTFE, the content of the heat-fusible fluororesin being 2% by weight or more but less than 12% by weight based on the total amount of the fluororesin.

Preferred embodiments of the fluororesin-coated article according to the second aspect of the present invention include:

(A) A fluororesin-coated article in which the heat-fusible fluororesin is PFA;

(B) A fluororesin-coated article in which the heat-fusible fluororesin is FEP;

(C) A fluororesin-coated article in which the base plate is an aluminum or aluminum-alloy plate having a surface which has been finely roughened by chemical or electrochemical etching;

(D) A fluororesin-coated article in which the inorganic pigment is at least one member selected from the group consisting of mica, pigment-coated mica, titanium oxide, fluorinated graphite, graphite and carbon; and (E) A fluororesin-coated article which further comprises a surface layer formed on the fluororesin composition layer, the surface layer consisting essentially of a fluororesin and containing substantially no pigment and adhesion aid.

According to the third aspect of the present invention, a fluororesin-coated article is provided which comprises a base plate having thereon in sequence a fluororesin coating and a surface layer which contains substantially no pigment and adhesion aid and comprises a mixture of a heat-fusible fluororesin and PTFE, the content of the heat-fusible fluororesin being 2% by weight or more but less than 12% by weight based on the total amount of the mixture.

Preferred embodiments of the fluororesin-coated article according to the third aspect of the present invention include:

(A) A fluororesin-coated article in which the heat-fusible fluororesin is PFA; and (B) A fluororesin-coated article in which the heat-fusible fluororesin is FEP.

DETAILED DESCRIPTION OF THE INVENTION

Figure 1:
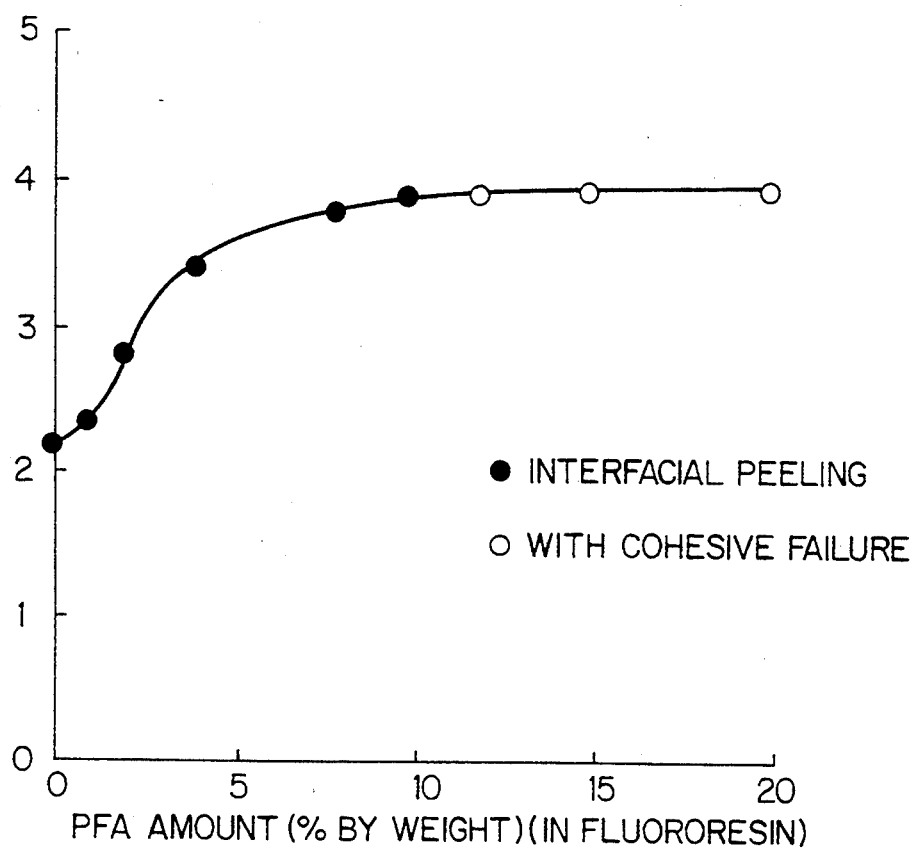
FIG. 1 is a graph showing a relationship between the amount of PFA incorporated in a fluororesin in a fluororesin-coated article according to the present invention and peel strength of the coating.

Effects of the fluororesin-coated articles according to the first and second aspects of the present invention are explained below.

The fine surface roughness of the base plate employed in the fluororesin-coated articles according to the first and second aspects of the present invention means not a surface roughness formed by physical roughening, such as sandblasting or grid blasting, generally conducted on metal surfaces and other surfaces, but formed mainly by chemical or electrochemical etching or combination thereof, although the etching may be combined with any of those physically roughening techniques.

When examined microscopically, the finely roughened surface is like the surface of a sponge, or is highly uneven with part of the metal crystal grains remaining undissolved.

It should, however, be noted that the method for producing the fine roughness is not limited to chemical or electrochemical etching and the like, and a suitable technique may be used to roughen the surface of a base plate as long as the resulting roughened surface attains a peel strength of about 2 kg/cm or more when adhesion of a coating of PTFE alone to the roughened surface is measured.

If physical roughening such as sandblasting, grid blasting or the like is used alone to roughen a surface, the peel strength of the coating of PTFE is below about 2 kg/cm.

Since the above-described surface roughness required in the present invention is easily obtained by the electrochemical etching of an aluminum or aluminum-alloy base plate, such materials and etching techniques are particularly preferably used.

The fluororesin composition for forming the coating in the fluororesin-coated article according to the first or second aspect of the present invention may be used in any form such as aqueous dispersion, powder or other forms. However, it is particularly preferred to use the composition in the form of an aqueous dispersion.

Examples of the heat-fusible fluororesin which can be used with PTFE as admixture include homopolymers and copolymers such as PFA (tetrafluoroethylene-perfluoroalkyl vinyl ether copolymers), FEP (tetrafluoroethylene-hexafluoropropylene copolymers), ETFE (tetrafluoroethylene-ethylene copolymers), CTFE (polychlorotrifluoroethylene) and the like. The heat-fusible fluororesin is not particularly limited as long as the heat-fusible fluororesin has a low melt viscosity as compared to that of PTFE. In this connection, PTFE is a so-called non-fusible polymer having a viscosity as high as $10^{11}$ to $10^{13}$ poises at 340° to 380° C., whereas the above-exemplified heat-fusible fluororesin have extremely low melt viscosities e.g., $10^4$ to $10^5$ poises at 380° C. for PFA, $4 \times 10^4$ to $10^5$ poises at 380° C. for FEP, $10^4$ to $10^5$ poises at 300° to 330° C. for ETFE, and $10^7$ poises at 230° C. for CTFE.

Although the mechanism of adhesion improvement by the incorporation of a heat-fusible fluororesin in the first and second aspects of the present invention has not yet been fully elucidated, it is presumed that the improved adhesion has been brought about by a combination of the following and other effects:

(1) The heat-fusible fluororesin is apt to penetrate into minute hollow portions of the roughened surface of the base plate because of its low melt viscosity, resulting in an enhanced anchoring effect; and (2) Decomposition products formed during sintering of the coating chemically bond to the metal surface.

The fluororesin-coated article according to the first or second aspect of the present invention is effective particularly when the coated article is produced by coating a flat base plate and then subjecting to post-processing wherein the coated plate is shaped by pressing into a pot, etc. For this reason, elongation at break of the coating is an important factor.

PAI, PES or the like exhibits elongation at break as low as several tens of percents at most. Therefore, if PAI, PES or the like is directly applied as a primer on a base plate, cracks are formed even when the resulting coated article is processed by pressing at a relatively low extension rate. Further, even if such an adhesive polymer is incorporated as an adhesion aid in a small amount into a coating, the coated article is apt to develop cracks and other coating defects in ordinary deep-draw processing for producing pots or the like. Even when cracks are not observed, a considerable number of pinholes are formed.

In addition, such adhesive polymers originally have a brown color and the polymers are colored strong brown upon baking for sintering of PTFE. In the case where no pigment is incorporated, the coating is colored a dim color that is not preferable from the standpoint of sense of beauty. In the case of incorporating a pigment, the resulting coating is colored like a blend of brown and a color produced by the pigment, and a desired tint cannot be obtained. There is a further problem that since the colored PAI, PES, or the like fades when irradiated with ultraviolet rays, the coating discolors under sunlight or light of a lamp.

Like PTFE, on the other hand, almost all of heat-fusible fluororesins have elongations at break as high as 200% or more. Therefore, a heat-fusible fluororesin, when incorporated into PTFE, is less apt to decrease elongation at break and to develop pinholes as compared with PAI and PES. In addition, heat-fusible fluororesins themselves are colorless and do not suffer coloration upon baking, etc.

Figure 3:
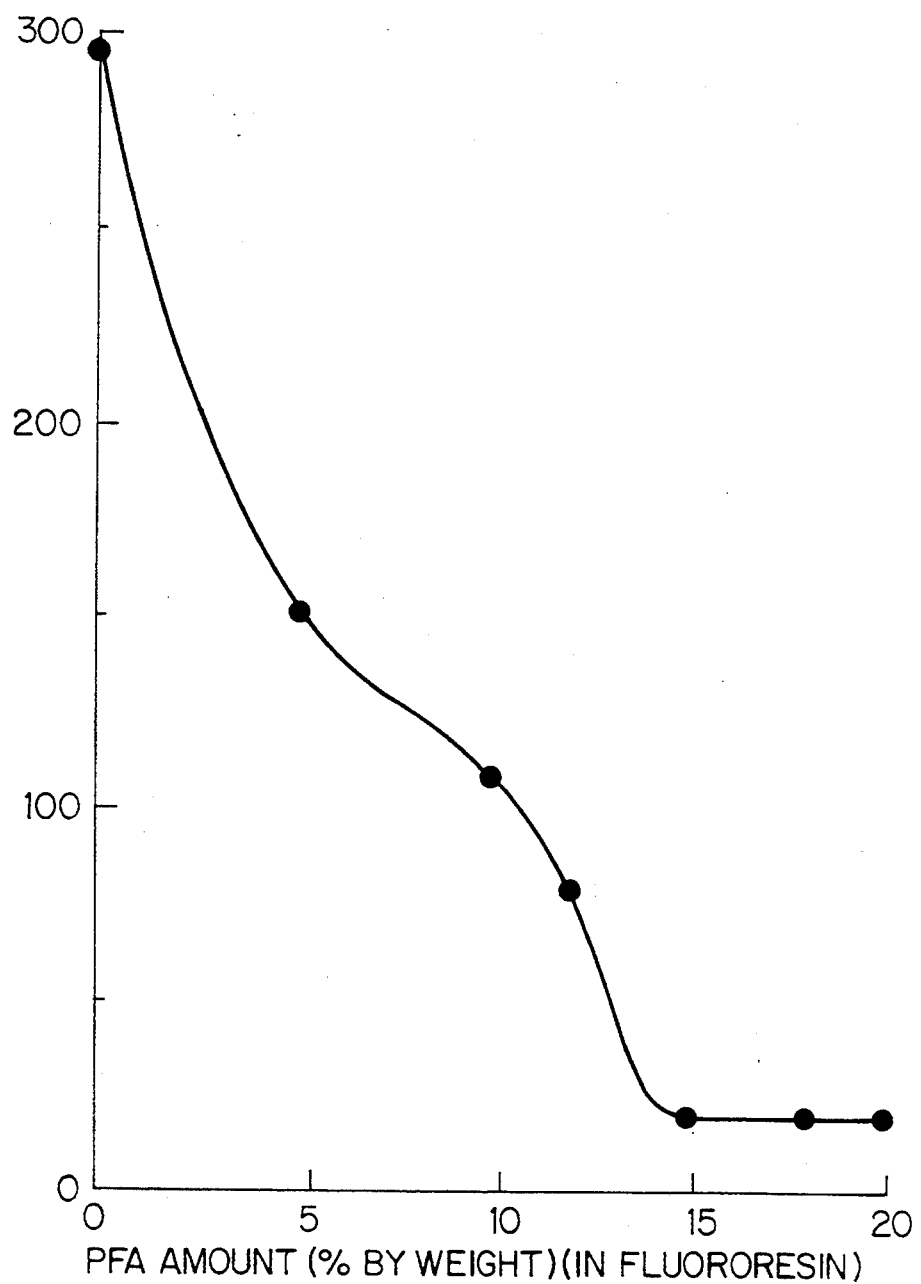
FIG. 3 is a graph showing a relationship between the amount of PFA incorporated in a fluororesin in a fluororesin-coated article according to the present invention and elongation at break of the coating.

However, as shown in FIG. 3, when the incorporated amount of PFA is increased and exceeds several tens of percent by weight, the elongation at break becomes extremely low. Such a large PFA amount, therefore, is improper in the fluororesin-coated articles according to the first and second aspects of the invention. Specifically, the incorporated amount of the heat-fusible fluororesin is preferably less than 12% by weight, such amount resulting in the elongation at break of 80% or more. In particular, in the case where severe deep-draw processing (for example, aluminum plate thickness reduction of 10% or more) is to be conducted, the amount of the heat-fusible is more preferably 10% by weight or less, such amount resulting in the elongation at break of 100% or more.

It is desirable that substantially no adhesive such as PAI, PES or the like is provided as a primer layer in the fluororesin-coated article or incorporated as an adhesion aid in the fluororesin composition because such an adhesive causes problems such as those described hereinabove.

Among various heat-fusible fluororesins, PFA is more preferably used particularly in fluororesin-coated articles which are used at high temperature because it is almost comparable to PTFE in heat resistance. In the fluororesin-coated articles according to the first and second aspects of the present invention, the effect of the incorporation of PFA is remarkable when the incorporated amount thereof is 2% by weight or more and, hence, such an amount is preferred.

In the case where the fluororesin-coated article is to be subjected to press shaping in deep-draw processing (in which an aluminum base plate and a coating thereon can be easily drawn) such as the processing for producing inner pots for rice cooker-warmers and the like, the more preferred amount of PFA incorporated is 4% by weight or more because such an amount results in a practically sufficient bonding strength even after the processing is conducted under especially severe conditions (for example, a plate thickness reduction of 10% or more).

If adhesion between the coating and the base plate is improved to a level at which the coating suffers internal failure (cohesive failure) when the coating film is peeled from the base plate, the bonding strength is no more heightened. In order to increase the bonding strength to such a level, the amount of PFA incorporated should be about 8% by weight or more. This range is most preferred. The relationship between the incorporated amount of PFA and bonding strength is shown in FIG. 1.

The peel strength shown in FIG. 1 was measured in the following manner. A coating composition composed of from 40 to 32% by weight of PTFE, from 0 to 8% by weight of PFA, 2% by weight of mica, 6.4% by weight of surfactant and 51.6% by weight of water was coated on a roughened surface of an aluminum base plate (which had been roughened in the manner as described in Example 1), followed by baking. A fluororesin tape was heat-fused onto the coating surface and then stripped in the 180° direction. Force required for stripping was measured, and peel force per 1-cm width was taken as the peel strength.

FEP also has excellent heat resistance and shows particularly good dispersibility into PTFE so that a fluororesin coating containing FEP is less apt to form spots and the like on the surface thereof and, hence, is apt to have excellent film properties and non-tackiness. For this reason, FEP also is advantageously used.

Figure 2:
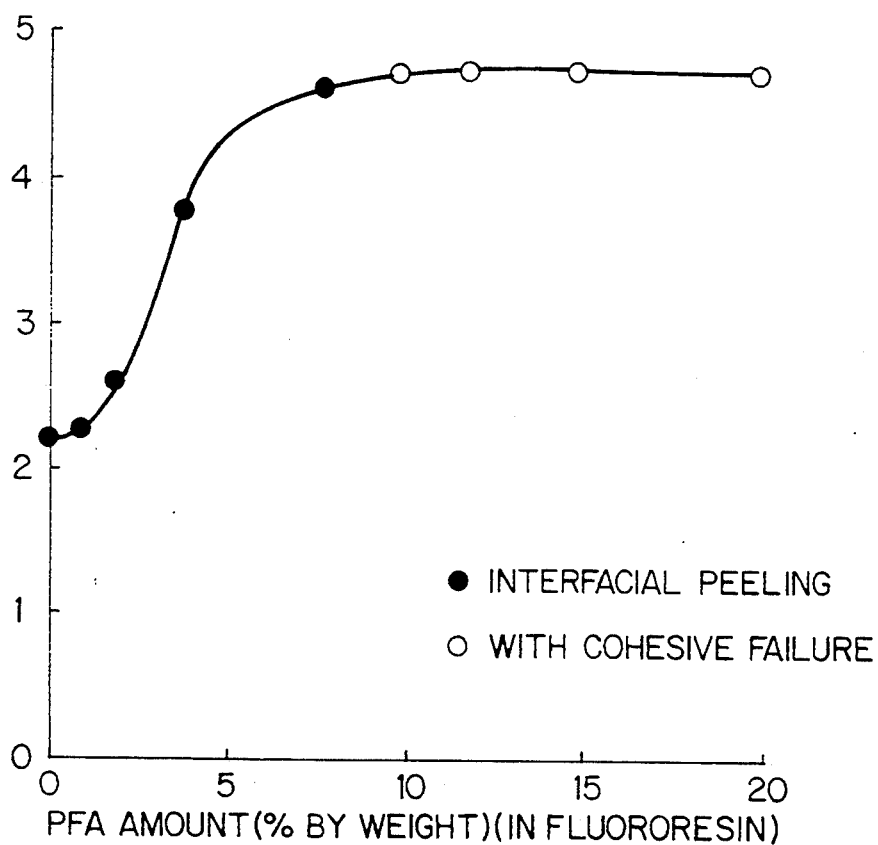
FIG. 2 is a graph showing a relationship between the amount of FEP incorporated in a fluororesin in a fluororesin-coated article according to the present invention and peel strength of the coating.

The incorporated amount of FEP in the first and second aspects of the present invention is preferably 2% by weight or more in order to produce a significant effect. A more preferred range is 4% by weight or more because such an amount brings about a practically sufficient bonding strength even after post-processing is conducted under severe pressing conditions. The most preferred amount thereof is about 8% by weight or more because such an amount brings about a bonding strength comparable to cohesive failure. The relationship between the incorporated amount of FEP and bonding strength is shown in FIG. 2.

The peel strength shown in FIG. 2 was measured in the following manner. A coating composition composed of from 40 to 32% by weight of PTFE, from 0 to 8% by weight of FEP, 2% by weight of mica, 6.4% by weight of surfactant and 51.6% by weight of water was coated on a roughened surface of an aluminum base plate, followed by baking. A fluororesin tape was heat-fused onto the coating surface and then stripped in the 180° direction. Force required for stripping was measured, and peel force per 1-cm width was taken as the peel strength.

In JP-B-63-33511 (the term "JP-B" as used herein means an "examined Japanese patent publication"), a fluororesin coating composition containing a specific proportion, 10 to 50%, of PFA is disclosed. It is known that this composition, after sintering, is less apt to undergo recrystallization and the resulting coating film contains a large proportion of amorphous portions and hence has enhanced elasticity, and in turn the scratch resistance of the coating surface is increased.

It should, however, be noted that the present invention is based on a technical idea which is utterly different from the above and in which the low melt viscosity of a heat-fusible fluororesin is utilized. Illustratively stated, especially in the fluororesin-coated articles according to the first and second aspects of the present invention, a heat-fusible fluororesin incorporated into the fluororesin mixture in an amount of 2% by weight or more but less than 12% by weight is allowed to penetrate into hollow portions of the base plate surface to thereby increase the bonding strength mainly owing to the anchoring effect.

The fluororesin composition layer according to the first and second aspects of the present invention generally has a thickness of 10 to 50 μm and preferably 10 to 30 μm.

The base plate having a finely roughened surface is essential in the fluororesin-coated articles according to the first and second aspects of the present invention and, as will be described in more detail in the following explanation of the fluororesin-coated article according to the second aspect of the present invention, the effects of the present invention are remarkable particularly when a pigment is incorporated in the coating.

In the case of incorporating no pigment, the effects of the present invention are produced more markedly when the coated article is processed under severe pressing conditions. However, the pressing conditions are not especially limited because even if the processing is conducted under pressing conditions that are not severe, the coated article has a prolonged working life and other advantages.

Representative examples of the pigment employed in the fluororesin-coated article according to the second aspect of the present invention include commonly used inorganic pigments such as titanium white, carbon, graphite, fluorinated graphite, ultramarine, red iron oxide, and the like and flake pigments such as mica, pigment-coated mica, flake iron oxide, flake metals and the like.

Use of titanium white or fluorinated graphite, in particular, in the coated article according to the second aspect of the invention enables formation of a coating of pure white color. Further, a wide variety of tints, such as pale colors, bright colors, and pale or bright colors of metallic tone, which do not undergo color change can be obtained by the use of rainbow mica obtained by the coating of mica with titanium oxide and producing colors by means of light interference, or by the combined use of such rainbow mica and silver mica, or of these and one or more commonly used pigments.

Colored mica obtained by coating mica with titanium oxide and iron oxide may, of course, be used to obtain a beautiful tint that does not undergo color change.

Particularly preferred pigments include mica, pigment-coated mica, titanium oxide, fluorinated graphite, graphite, carbon and the like. These may be used alone or in combination. In the case where these pigments are used alone, the amounts thereof incorporated in the fluororesin composition are as follows. Mica and pigment-coated mica are preferably incorporated in an amount of from 1 to 15% by weight, more preferably from 1 to 10% by weight, based on the total amount of solid components. Titanium oxide and fluorinated graphite are preferably incorporated in an amount of from 10 to 25% by weight, more preferably from 15 to 25% by weight, based on the total amount of solid component. Carbon and graphite are preferably incorporated in an amount of from 1 to 10% by weight, more preferably from 1 to 5% by weight, based on the total amount of solid component.

In the case of using those pigments in combination, the amount of each pigment should be suitably determined according to the desired tint. In this case, however, the total amount of the pigments should be in the range of from 1 to 25% by weight, as in the case of using it alone. If the amount thereof is below 1% by weight, it is difficult to obtain the desired tint. The amount of more than 25% by weight is not preferred because the resulting coatings have impaired properties such as reduced elongation and increased pinhole number.

In the case of using a pigment, such as titanium white, which is required to be incorporated in a large amount in order to attain desired coloring in the fluororesin-coated article according to the second aspect of the present invention, there are some cases where even though the number of pinholes has been reduced, the resulting coating still contains a large number of pinholes and also has impaired non-tackiness. Diminution of such pinholes and improvement of the non-tackiness can be attained to practically acceptable degrees by forming, as a surface layer, a layer of a fluororesin containing substantially no pigment. This fluororesin is not particularly limited as long as it contains substantially no pigment.

If a base plate is coated with a pigment-containing fluororesin not according to the second aspect of the present invention, the adhesion of the coating cannot be improved and it is difficult to diminish pinholes to a practically acceptable level, even when the above-described outermost layer is formed.

Although coloring with mica or the like can still produce practically usable coated articles according to the second aspect of the present invention even without forming an outermost layer as described above, the performances of these coated articles can be further improved by providing such an outermost layer. Formation of the fluororesin outermost layer is especially effective when the mica used has large particle diameters because use of such mica is apt to result in the formation of pinholes.

As one embodiment of the second aspect of the present invention, a fluororesin-coated article can effectively be produced by a method in which such an outermost layer is formed according to the third aspect of the present invention.

As will be described later, the technique for producing the coated article according to the third aspect of the present invention is not always combined with the technique for producing the coated article according to the second aspect of the present invention, and it fully achieves the desired effects even when it is used in combination with a conventional technique.

Next, effects of the fluororesin-coated article according to the third aspect of the present invention are explained. The object of the third aspect of the present invention is to provide a fluororesin-coated article which has significantly diminished coating defects such as pinholes and is imparted exceedingly high corrosion resistance, by providing a surface layer composed of a mixture of PTFE and a heat-fusible fluororesin on the surface of a fluororesin coating.

Use of a mixture of PTFE and a heat-fusible fluororesin as the surface layer is effective in greatly diminishing pinholes and enhancing corrosion resistance, as compared with use of either PTFE or a heat-fusible fluororesin singly as a surface layer.

Although the mechanism of the above has not been elucidated so far, it is presumed that the above has been brought about by a combination of the following and other effects:

(1) During sintering, the heat-fusible fluororesin melts and flows, with the matrix PTFE, thereby filling up hollow portions of the fluororesin coating to remedy defects suffered when PTFE is used alone; and (2) PTFE remedies defects encountered in single use of the heat-fusible fluororesin due to its too high melt-flowability, so that the shape of coating is retained.

These effects are realized when the heat-fusible fluororesin is incorporated in an amount of 2% by weight or more, and become remarkable when the amount thereof exceeds 4% by weight based on the total amount of the mixture. However, amounts thereof exceeding 20% by weight are not preferred because the film-forming properties of the mixture are impaired and the resulting coating film has unevenness such as spots and other defects, resulting in lessened effects.

From the standpoint of subjecting the coated article to press processing, on the other hand, incorporated amounts of the heat-fusible fluororesin of 12% by weight or more are not preferred because the resultant coating films have considerably reduced elongations at break, as shown in FIG. 3, and develop defects when drawn in press processing.

In particular, in the case where severe deep-draw processing (for example, base plate thickness reduction of 10% or more) is to be conducted, the amount thereof is more preferably 10% by weight or less, such amount resulting in elongation at break of 100% or more.

Like the fluororesin compositions for use for the first and second aspects of the present invention, the fluororesin composition for forming the surface layer in the fluororesin-coated article according to the third aspect of the present invention may be applied in the form of any of aqueous dispersion, powder and other forms, but it particularly preferably is applied in the form of an aqueous dispersion.

As the heat-fusible fluororesin to be mixed with PTFE, any of the heat-fusible fluororesins that can be employed in the first and second aspects of the present invention may be used.

Among these heat-fusible fluororesins, PFA is more preferably used particularly in production of fluororesin-coated articles for used at high temperature because it is almost comparable to PTFE in heat resistance.

FEP also has excellent heat resistance and shows particularly good dispersibility into PTFE so that the surface layer containing FEP is less apt to form spots and the like on the surface thereof and, hence, is apt to have excellent film properties and non-tackiness. For this reason, FEP also is advantageously used.

In the third aspect of the present invention, the thickness of the surface layer is preferably 10 to 30 μm and more preferably 10 to 20 μm. When the thicknesses is less than 10 μm, a pinhole-diminishing effect is not sufficient. When the thicknesses exceeds 30 μm, cracks tend to be formed.

The fluororesin coating to be covered with the surface layer need not be limited to the fluororesin composition layers of the first and second aspects of the present invention as described above and may be any conventional fluororesin coating. The fluororesin coating generally has a thickness of 10 to 50 μm and preferably 10 to 30 μm.

The present invention will be explained below in more detail with reference to the following examples, which should not be construed to be limiting the scope of the invention.

EXAMPLES 1 TO 7 AND COMPARATIVE EXAMPLES 1 TO 5

As a base plate, a 2.5 mm-thick aluminum plate ("ASB", manufactured by Kobe Steel, Ltd., Japan) was used.

First, electrochemical etching treatment of the aluminum plate was conducted in an aqueous solution of ammonium chloride using the aluminum plate as the anode at an electrical quantity of 25 C/cm$^2$, thereby finely roughening the surface of the plate.

A first layer was formed on the roughened surface by coating the surface with each of the fluororesin compositions as shown in Tables 1 and 2 and then baking the coating. Thereafter, a second layer was formed by coating the first layer with a PTFE dispersion ("D-1F", manufactured by Daikin Industries, Ltd., Japan) containing no filler, drying the coating to remove the water, and then baking the dried coating at 400° C. for 10 minutes. The first and second layers were formed at a thickness of 15 μm each and, hence, the total thickness of the two layers was 30 μm (provided that the second layer was omitted for Example 6 and Comparative Example 3). Each of the thus-obtained coated plates was subjected to deep-draw press shaping, thereby obtaining rice pots. In Tables 1 and 2, the amounts of the components are shown in terms of % by weight.

The pressed articles thus obtained from the coated plates were evaluated for the following properties. The results of these evaluations are summarized also in Tables 1 and 2.

Adhesion (%)

The coating was crosshatch-wise incised with a knife at a depth reaching the base to make one hundred 1-mm squares. An adhesive cellophane tape was applied to the incised surface and then stripped immediately. This procedure was repeated 20 times and, thereafter, the number of remaining squares out of the 100 squares was counted and taken as the percentage adhesion (%). (This evaluation was made with respect to both the bottom and the side wall of the rice pot.)

Peel strength (kg/cm)

A fluororesin tape was heat-fused onto the coating surface and then stripped in the 180° direction. Force required for stripping was measured, and the peel force per 1-cm width was taken as the peel strength.

Pinhole degree (mA)

The shaped article in the form of a pot was filled with 2% by weight NaCl aqueous solution. One of a pair of electrodes was placed in the solution, the other was attached to the outer surface of the wall of the shaped article, and the electric current (mA) passing through the wall of the shaped article was measured.

The current value corresponds to the degree of pinhole number because the current passing through the shaped article increases as the total area of pinholes reaching the base plate (i.e., aluminum-alloy base in these examples) increased. Too high a pinhole degree was not preferred since the higher the pinhole degree, the lower the corrosion resistance.

Tint

Tint is examined visually.

Color fading in sunlight

A test piece was irradiated with ultraviolet rays (120-W UV lamp) for 1 hour, which corresponded in ultraviolet dose to direct exposure to sunlight for 1 to 3 days. This irradiation treatment is conducted while a half portion of the surface of the test piece was masked, and after the irradiation, the difference in color between the masked and unmasked portions was measured with a color-difference meter.

Samples with $\Delta E_{ab}$ of 1.5 or less were regarded as free from color change. Changed colors were judged visually.

TABLE 1

|  | Example | Comparative Example | | | Example | | |
| --- | --- | --- | --- | --- | --- | --- | --- |
|  | 1 | 1 | 2 | 3 | 2 | 3 | 4 |
| PTFE | 36 | 40 | 38.6 | 60 | 36.8 | 38.4 | 36 |
| Heat-fusible fluororesin | PFA 4 | — | — | — | PFA 3.2 | PFA 1.6 | FEP 4 |
| PAI | — | — | 0.8 | — | — | — | — |
| Pigment | Mica[1] 2 | Mica[1] 2 | Mica[1] 1.8 Carbon 0.1 | — | Mica[2] 2 | Mica[2] 2 | Mica[3] 2 |
| Surfactant | 6.4 | 6.4 | 6.0 | 6.0 | 6.4 | 6.4 | 6.4 |
| Water | 51.6 | 51.6 | 52.7 | 34 | 51.6 | 51.6 | 51.6 |
| Heat-fusible fluororesin content (% by weight) | 10 | — | — | — | 8 | 4 | 10 |
| Second layer | present | present | present | absent | present | present | present |
| Peel strength (kg/cm) | 3.5 | 1.5 | 3.0 | 2.1 | 2.8 | 2.5 | 3.8 |
| Adhesion (%) bottom/side | 100/100 | 84/97 | 100/100 | 97/100 | 100/100 | 100/100 | 100/100 |
| Pinhole degree (mA) | 55 | 130 | 119 | 50 | 74 | 98 | 60 |

TABLE 1-continued

|  | Example 1 | Comparative Example 1 | Comparative Example 2 | Comparative Example 3 | Example 2 | Example 3 | Example 4 |
| --- | --- | --- | --- | --- | --- | --- | --- |
| Tint | golden yellow, metallic | golden yellow, metallic | golden brown, metallic | gray | green, metallic | green, metallic | red, metallic |
| Color fading in sunlight | none | none | turned golden yellow | none | none | none | none |

Note:
[1] Iriodin 500 manufactured by Merk Japan Co.
[2] Iriodin 235 manufactured by Merk Japan Co.
[3] Iriodin 504 manufactured by Merk Japan Co.

TABLE 2

|  | Example 5 | Example 6 | Example 7 | Comparative Example 4 | Comparative Example 5 |
| --- | --- | --- | --- | --- | --- |
| PTFE | 36.8 | 36.8 | 36.8 | 40 | 40 |
| Heat-fusible fluororesin | FEP 3.2 | FEP 3.2 | PFA 3.2 | — | — |
| PAI | — | — | — | — | 1 |
| Pigment | Mica[3] 2 | Mica[3] 2 | Titanium oxide 10 | Titanium oxide 10 | Titanium oxide 10 |
| Surfactant | 6.4 | 6.4 | 6.0 | 6.0 | 6.0 |
| Water | 51.6 | 51.6 | 44 | 44 | 43 |
| Heat-fusible fluororesin content (% by weight) | 8 | 8 | 8 | — | — |
| Second layer | present | present | absent | present | present |
| Peel strength (kg/cm) | 3.4 | 3.2 | 2.6 | 1.1 | 2.6 |
| Adhesion (%) bottom/side | 100/100 | 100/100 | 100/100 | 27/56 | 100/100 |
| Pinhole degree (mA) | 81 | 120 | 85 | 452 | 178 |
| Tint | red, metallic | red, metallic | pure white | pure white | beige |
| Color fading in sunlight | none | none | none | none | turned white, with part of beige remaining |

Note: [3] Iriodin 504 manufactured by Merk Japan Co.

EXAMPLE 8 AND COMPARATIVE EXAMPLES 6 AND 7

Articles coated with pigment-free fluororesins were prepared.

Electrochemical etching treatment of a 2.5 mm-thick aluminum plate ("ASB", manufactured by Kobe Steel, Ltd.) was conducted in an aqueous solution of ammonium chloride using the aluminum plate as the anode at an electrical quantity of 25 C/cm², thereby finely roughening the surface of the plate. Thereafter, each of the fluororesin compositions having the resin formulations as shown in Table 3 and containing 6.4% of surfactant and 53.6% of water was coated on the roughened surface, and the coating was dried to remove the water and then baked at 400° C. for 30 minutes. The fluororesin coating layer was formed at a thickness of 25 μm. In Table 3, the amount of the components are shown in terms of % by weight.

Properties of the thus-obtained coated plates (flat plates) and properties of the side wall and bottom of each of pot-form pressed articles (pots) obtained by press-shaping the flat plates in deep-draw processing were evaluated. The results obtained are summarized in Table 3.

TABLE 3

|  | Example 8 | Comparative Example 6 | Comparative Example 7 |
| --- | --- | --- | --- |
| Resin Formulation |  |  |  |
| PTFE | 93 | 100 | 98 |
| PFA | 7 | — | — |
| PAI | — | — | 2 |
| Flat plate |  |  |  |
| Peel strength (kg/cm) | 2.9 | 1.3 | 2.8 |
| Adhesion (%) | 100 | 98.5 | 100 |
| Pot |  |  |  |
| Adhesion (%) Bottom | 100 | 26 | 86 |
| Adhesion (%) Side | 100 | 51 | 97 |
| Pinhole degree (mA) | 6 | 55 | 255 |

EXAMPLES 9 TO 14 AND COMPARATIVE EXAMPLES 8 TO 12

Electrochemical etching treatment of a 2.5 mm-thick aluminum plate ("ASB", manufactured by Kobe Steel, Ltd.) was conducted in an aqueous solution of ammonium chloride using the aluminum plate as the anode at an electrical quantity of 25 C/cm², thereby finely roughening the surface of the plate.

The toughened surface was coated with a composition consisting of 38.6% by weight PTFE, 0.8% by weight PAI, 1.8% by weight mica, 0.1% by weight carbon, 6.0% by weight surfactant, and 52.7% by weight water. This coating was dried to remove the water and then baked at 400° C. for 30 minutes. The fluororesin coating layer was formed at a thickness of 20 μm.

Thereafter, a second layer was formed by coating the above layer with each of the fluororesin compositions having the resin formulations as shown in Table 4 and containing 6.4% of surfactant and 53.6% of water, drying the coating to remove the water, and then baking the dried coating at 400° C. for 10 minutes. This second fluororesin layer was formed at a thickness of 15 μm (provided that the second layer was omitted for Comparative Example 8). In Table 4, the amounts of the components are shown in terms of % by weight.

The thus-obtained coated plates were press-processed into pots and then evaluated for pinhole degree. The results obtained are summarized in Table 4.

TABLE 4

|  | Comparative Example | | | | Example | | | | Comparative Example | Example | |
|---|---|---|---|---|---|---|---|---|---|---|---|
|  | 8* | 9 | 10 | 11 | 9 | 10 | 11 | 12 | 12 | 13 | 14 |
| PTFE | — | 100 | — | 99 | 98 | 96 | 92 | 90 | 80 | 92 | 92 |
| PFA | — | — | 100 | 1 | 2 | 4 | 8 | 10 | 20 | — | — |
| FEP | — | — | — | — | — | — | — | — | — | 8 | — |
| ETFE | — | — | — | — | — | — | — | — | — | — | 8 |
| Pinhole degree (mA) | 386 | 131 | 119 | 126 | 108 | 80 | 55 | 43 | 232 | 67 | 58 |

Note: *The second layer was not formed in Comparative Example 8.

As described above, according to the first and second aspects of the present invention, fluororesin-coated articles are obtained in which the coatings are colorless and transparent so as to utilize the colors of the base plates or are of various colors including white, pale and bright tints, have excellent adhesion to the base plates and high elongations at break, and suffer almost no color fading by sunlight etc. Farther, the coated articles can be subjected to press shaping. Furthermore, the coated articles have greatly diminished coating defects such as pinholes.

According to the third aspect of the present invention, exceedingly high corrosion resistance can be imparted to a fluororesin-coated article by coating thereon as the surface layer a mixture of PTFE and a heat-fusible fluororesin to thereby greatly diminish coating defects such as pinholes.

In particular, significant effects are produced when the fluororesin-coated article is used in applications, such as inner pots for rice cooker-warmers, pots, grill pans, and the like, which generally are prone to suffer corrosion upon contact with liquids during cooking.

The excellent corrosion resistance is realized because the fluororesin-coated flat plate according to the invention is well prevented from developing pinholes and other coating defects when it is press-shaped in deep-draw processing in which the coated plate undergoes a high degree of deformation (the above products are representative examples), such coating defects conventionally being prone to be formed in such deep-draw processing.

Although the technique for producing the fluororesin-coated article according to the third aspect of this invention produces marked effects when combined with that for producing the fluororesin-coated article according to the second aspect of the invention, it also brings about sufficient effects even when combined with a conventional technique.

While the invention has been described in detail and with reference to specific embodiments thereof, it will be apparent to one skilled in the art that various changes and modifications can be made therein without departing from the spirit and scope thereof.

What is claimed is:

1. A fluororesin-coated article comprising a metal base plate having a surface roughened by electrochemical etching or chemical etching and having formed directly thereon a layer of a fluororesin composition having a thickness of 10 to 30 μm, said fluororesin composition layer consisting essentially of a mixture of a polytetrafluoroethylene and a heat-fusible fluororesin selected from the group consisting of a copolymer of tetrafluoroethylene and perfluoroalkyl vinyl ether, a copolymer of tetrafluoroethylene and hexafluoropropylene, a copolymer of tetrafluoroethylene and ethylene and polychlorotrifluoroethylene, the content of said heat-fusible fluororesin being 2% by weight or more but less than 10% by weight based on the total amount of said fluororesin composition.

2. The fluororesin-coated article as claimed in claim 1, wherein said heat-fusible fluororesin is the copolymer of tetrafluoroethylene and perfluoroalkyl vinyl ether.

3. The fluororesin-coated article as claimed in claim 1, wherein said heat-fusible fluororesin is the copolymer of tetrafluoroethylene and hexafluoropropylene.

4. The fluororesin-coated article as claimed in claim 1, wherein the heat-fusible fluororesin is the copolymer of tetrafluoroethylene and perfluoroalkyl vinyl ether and has a melt viscosity of $10^4$ to $10^5$ poises at 380° C.

5. The fluororesin-coated article as claimed in claim 1, wherein the heat-fusible fluororesin is the copolymer of tetrafluoroethylene and hexafluoropropylene and has a melt viscosity of $4 \times 10^4$ to $10^5$ poises at 380° C.

6. The fluororesin-coated article as claimed in claim 1, wherein the heat-fusible fluororesin is the copolymer of tetrafluoroethylene and ethylene and has a melt viscosity of $10^4$ to $10^5$ poises at 300° to 330° C.

7. The fluororesin-coated article as claimed in claim 1, wherein the heat-fusible fluororesin is the polychlorotrifluoroethylene and has a melt viscosity of $10^7$ poises at 230° C.

8. A fluororesin-coated article comprising a metal base plate having a surface roughened by electrochemical etching or chemical etching and having formed directly thereon a layer of a fluororesin composition having a thickness of 10 to 30 μm, said fluororesin composition layer consisting essentially of (i) an inorganic pigment in an amount of 1 to 25% by weight based on the total amount of solid components of the composition and (ii) a fluororesin mixture consisting essentially of a polytetrafluoroethylene and a heat-fusible fluororesin selected from the group consisting of a copolymer of tetrafluoroethylene and perfluoroalkyl vinyl ether, a copolymer of tetrafluoroethylene and hexafluoropropylene, a copolymer of tetrafluoroethylene and ethylene and polychlorotrifluoroethylene, the content of said heat-fusible fluororesin being 2% by weight or more but less than 10% by weight based on the total amount of said fluororesin mixture.

9. The fluororesin-coated article as claimed in claim 8, wherein said heat-fusible fluororesin is the copolymer of tetrafluoroethylene and perfluoroalkyl vinyl ether.

10. The fluororesin-coated article as claimed in claim 8, wherein said heat-fusible fluororesin is the copolymer of tetrafluoroethylene and hexafluoropropylene.

11. The fluororesin-coated article as claimed in claim 8, wherein said inorganic pigment is at least one member selected from the group consisting of mica, pigment-coated mica, titanium oxide, fluorinated graphite, graphite and carbon.

12. The fluororesin-coated article as claimed in claim 8, wherein the heat-fusible fluororesin is the copolymer of tetrafluoroethylene and perfluoroalkyl vinyl ether and has a melt viscosity of $10^4$ to $10^5$ poises at 380° C.

13. The fluororesin-coated article as claimed in claim 8, wherein the heat-fusible fluororesin is the copolymer of tetrafluoroethylene and hexafluoropropylene and has a melt viscosity of $4 \times 10^4$ to $10^5$ poises at 380° C.

14. The fluororesin-coated article as claimed in claim 8, wherein the heat-fusible fluororesin is the copolymer of tetrafluoroethylene and ethylene and has a melt viscosity of $10^4$ to $10^5$ poises at 300° to 330° C.

15. The fluororesin-coated article as claimed in claim 8, wherein the heat-fusible fluororesin the is polychlorotrifluoroethylene and has a melt viscosity of $10^7$ poises at 230° C.

16. A fluororesin-coated article comprising a metal base plate having a surface roughened by electrochemical etching or chemical etching, having formed directly thereon a layer of a fluororesin composition, and having formed further thereon a surface layer having a thickness of 10 to 30 μm, said fluororesin composition layer consisting essentially of (i) an inorganic pigment in an amount of 1 to 25% by weight based on the total amount of solid components of the composition and (ii) a fluororesin mixture consisting essentially of a polytetrafluoroethylene and a heat-fusible fluororesin selected from the group consisting of a copolymer of tetrafluoroethylene and perfluoroalkyl vinyl ether, a copolymer of tetrafluoroethylene and hexafluoropropylene, a copolymer of tetrafluoroethylene and ethylene and polychlorotrifluoroethylene, the content of said heat-fusible fluororesin being 2% by weight or more but less than 10% by weight based on the total amount of said fluororesin mixture, and said surface layer consisting essentially of a fluororesin.

17. The fluororesin-coated article as claimed in claim 16, wherein said heat-fusible fluororesin is the copolymer of tetrafluoroethylene and perfluoroalkyl vinyl ether.

18. The fluororesin-coated article as claimed in claim 16, wherein said heat-fusible fluororesin is the copolymer of tetrafluoroethylene and hexafluoropropylene.

19. The fluororesin-coated article as claimed in claim 16, wherein said inorganic pigment is at least one member selected from the group consisting of mica, pigment-coated mica, titanium oxide, fluorinated graphite, graphite and carbon.

20. The fluororesin-coated article as claimed in claim 16, wherein the heat-fusible fluororesin is the copolymer of tetrafluoroethylene and perfluoroalkyl vinyl ether and has a melt viscosity of $10^4$ to $10^5$ poises at 380° C.

21. The fluororesin-coated article as claimed in claim 16, wherein the heat-fusible fluororesin is the copolymer of tetrafluoroethylene and hexafluoropropylene and has a melt viscosity of $4 \times 10^4$ to $10^5$ poises at 380° C.

22. The fluororesin-coated article as claimed in claim 16, wherein the heat-fusible fluororesin is the copolymer of tetrafluoroethylene and ethylene and has a melt viscosity of $10^4$ to $10^5$ poises at 800° to 330° C.

23. The fluororesin-coated article as claimed in claim 16, wherein the heat-fusible fluororesin is the polychlorotrifluoroethylene and has a melt viscosity of $10^7$ poises at 230° C.

* * * * *